United States Patent
Yabuta

[15] 3,662,635
[45] May 16, 1972

[54] ELECTROMAGNETIC INDUCTION TYPE FEEDING AND POSITIONING METHOD AND APPARATUS FOR METAL PLATES

[72] Inventor: Yukio Yabuta, Kanagawa, Japan

[73] Assignee: Fuji Photo Film Co., Ltd., Kanagawa, Japan

[22] Filed: Mar. 24, 1970

[21] Appl. No.: 22,297

[30] Foreign Application Priority Data

Mar. 25, 1969 Japan....................................44/22616

[52] U.S. Cl....................................83/23, 83/35, 83/219, 83/268, 83/401, 83/467, 198/41, 271/DIG. 3
[51] Int. Cl. .........................................B65h 5/00, B65h 9/06
[58] Field of Search....................83/13, 35, 42, 36, 219, 220, 83/268, 269, 401, 402, 467, 23; 271/18 A, 63 A, DIG. 3; 198/41

[56] References Cited

UNITED STATES PATENTS 2,767,823 10/1956 Beamish..........................271/DIG. 3
3,554,670 1/1971 Von Starck et al. ..................198/41 X Primary Examiner—James M. Meister
Attorney—Sughrue, Rothwell, Mion, Zinn & Macpeak

[57] ABSTRACT

A metal plate to be processed is supplied to, positioned in and removed from a processing machine by electromagnetic induction feeding and positioning apparatus. The feeding and positioning units comprise electromagnets which are disposed under a table on which the metal plate is fed, and adjustable stopper and guide means are provided on the table to properly position the metal plate at a work station.

14 Claims, 2 Drawing Figures

PATENTED MAY 16 1972 3,662,635

INVENTOR
YUKIO YABUTA

BY Sughrue, Rothwell, Mion, Zinn & Macpeak
ATTORNEYS

ELECTROMAGNETIC INDUCTION TYPE FEEDING AND POSITIONING METHOD AND APPARATUS FOR METAL PLATES

BACKGROUND OF THE INVENTION

The present invention relates to a method of supplying a metal plate to, positioning the metal plate in and removing the metal plate from a processing machine automatically, and in particular to a method of supplying a metal plat to, positioning the same in and removing the same from a processing machine such as a cutting machine, pressing machine, punching machine and the like automatically and precisely.

In the conventionally known type of processing machine, the metal plate or other material to be processed is supplied to, positioned in and removed from the processing machine, such as a cutting machine, pressing machine, punching machine and the like, manually by an operator of the machine. This is because the automatic supplying, positioning and removing apparatus for the metal plates are not able to be easily adapted to such processing machines due to restrictions from the structural viewpoint.

In other words, in the conventionally known types of the processing machine, it has been disadvantageous to provide an automatic metal plate supplying, positioning and removing device on the processing machine. It has been economically disadvantageous to provide such automatic devices in the processing machine, because the combination of the automatic device and the processing machine becomes too complicated. Since the metal plate to be processed in the processing machine has been required to be supplied, positioned or removed manually, the automatic supplying device and the like would have to be constructed in the shape of a conveyor or industrial robot. The combination with such a conveyor or robot is too complicated. In spite of the complexity in construction of the combination of an automatic supplying device or the like with the processing machine, the economic advantage obtained by such automation has not justified its cost. This is why the conventionally known type of the processing apparatus has not been equipped with automatic metal plate supplying, positioning and removing devices.

In view of the above-described conventional types of processing machines, a need has arisen for a new and advantageous automatic supplying device and the like which can be easily combined with the processing apparatus and is combined therewith in a simple construction.

SUMMARY OF THE INVENTION

A principal object of the present invention is to provide a method of supplying a metal plate to, positioning the same in and removing the same from a processing machine which requires only a simple construction utilizing electromagnetic means.

Another object of the present invention is to provide a method of supplying a metal plate to, positioning the same in and removing the same from the processing machine wherein the metal plate is handled without being directly engaged by feeding means.

The above objects are accomplished by providing electromagnetic induction feeding and positioning units for the metal plate to be processed. These units comprise electromagnets which are disposed under the table on which he metal plate is fed. Adjustable stopper and guide means are provided on the table to properly position the plate at a work station.

DESCRIPTION OF THE PREFERRED EMBODIMENT

Figure 1:
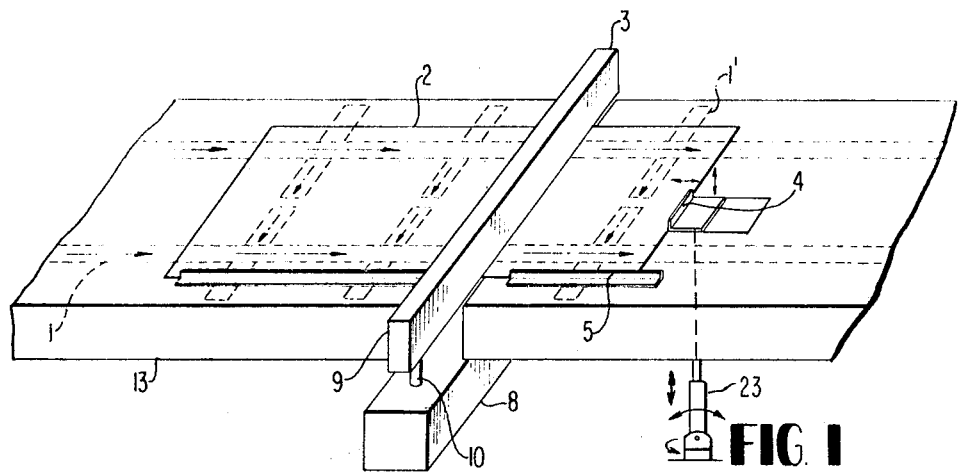
FIG. 1 is a perspective view of the essential portion of the construction of the apparatus made according to the method of the present invention, constructed for a shearing line of a processing machine.

Now referring to the drawing, the reference numeral 1 indicates a feeding unit 1 of the electromagnetic induction type for feeding a metal plate 2 to be processed. The feeding unit 1 consists of a plurality of electromagnets positioned under a feeding table 13 in parallel relation to the direction of the feeding. The reference numeral 1' indicates a metal plate positioning unit of the electromagnetic induction type. The positioning unit 1' consists of a plurality of electromagnets disposed under the feeding table 13 in parallel relationship with one another and in perpendicular relation to the direction of feeding. Both sets of electromagnets are controlled by conventional control means 21 and a conventional power supply 22 for movement of the metal workpieces by the generated flux field. The B.D. Beamish U.S. Pat. No. 2,767,823 discloses one form of conventional controls for time activation of the electromagnetic flux which positions the metal workpieces in a position having the least resistance to the electromagnetic flux field. A co-pending application, Ser. No. 887,836 filed Dec. 24, 1969 by the present inventor, discloses another form of electromagnetic induction. Accordingly, the metal plate 2 is moved in the feeding direction by the feeding unit 1, and is moved laterally by the positioning unit 1'.

In FIG. 1, showing an embodiment of an apparatus in accordance with the method of the present invention for a shearing line of a processing machine, a shearing cutter 3 of any suitable construction is disposed in the processing line of the machine. The shearing cutter 3 is so located that the metal plate 2 is fed just under the cutter blade as it is being advanced. The positioning unit 1' is disposed in the vicinity of the shearing cutter 3 to accurately position the metal plate 2 at the shearing cutter 3. At the downstream end of the shearing cutter 3, a retractable stopper member 4 of any suitable construction is disposed for stopping the metal plate 2 at the prescribed position.

The stopper member 4 is made so as to be adjustable in the feeding direction of the metal plate 2 so that the length of the metal plate 2 to be cut by the cutter 3 may be varied. The stopper member 4 may also be rotatable about an axis transverse to the plane of the feeding table 13, so that the stopper member 4 can be adjusted to engage the end of the metal plate 2 in whatever angle it may be positioned on the feeding table 13. The adjustment in the feeding direction, rotation and retraction can be accomplished by any suitable control means 23.

Near the side edge of the feeding table 13 downstream of the cutter 3, a guide member 5 is disposed. The guide member 5 is pivotable about an axis transverse to the plane of the feeding table 13. A suitable guide control 24 can be utilized to maintain the appropriate position of the guide members such as guide member 5 in FIG. 2. On the upstream side of the shearing cutter 3 another guide member may be disposed near the side edge of the feeding table 13. This member may also be rotatable about an axis transverse to the plane of the surface of the feeding table 13 or may be fixed on the feeding table 13.

In the case where the electromagnetic force on the plate 2 in the feeding direction is comparatively larger than the force in the lateral direction by the positioning unit 1', the stopper member 4 is rotated in an appropriate manner about its axis transverse to the table surface in order to aid the angle making effect of the guide member 5 on the side edge of the feeding table 13.

In the operation of present metal plate feeding apparatus in the shearing cutter line of a processing machine, the metal plate 2 is fed and processed, and taken out of the processing machine as described hereinafter. The metal plate 2 to be processed is fed to the shearing cutter 3 on the feeding table 13 by the electromagnetic force created by the electromagnetic induction type feeding unit 1. The metal plate 1 is advanced on the table 13 until the leading end of the metal plate 2 engages the stopper member 4 projecting upwardly from the table surface. Thus, the metal plate 4 is positioned under the cutter blade of the shearing cutter 3.

By the position of the stopper member 4, the size of the metal plate 4 to be cut is determined. Since the stopper member 4 is adjustable in the feeding direction, the size of the metal plate 2 to be cut is controlled by appropriately adjusting the stopper member 4 in the feeding direction. Since the stopper member 4 is retractable from the surface of the feeding table 13, the metal plate 2 can be fed past the stopper member 4 by retracting the stopper member 4 below the surface of the feeding table 13 after the metal plate 2 is cut by the shearing cutter 3.

In the case where the metal plate 2 is to be cut in a direction transverse to the feeding direction thereof, the guide member 5 is positioned in parallel relation to the direction of the feeding of the metal plate 2. More exactly, the guide member 5 is positioned in transverse relation to the cutter blade of the shearing cutter 3. The metal plate 2 is urged laterally and pushed against the guide member 5 by the electromagnetic force of the positioning unit 1'. In the case where the guide member 5 is inclined at an angle to the feeding direction and the electromagnetic induction type positioning unit 1' is energized, the metal plate 2 to be processed is moved laterally into engagement with the guide member 5 and positioned so as to be inclined to the feeding direction. Thus, the metal plate 2 can be cut at a desired angle to the direction of the processing line.

Figure 2:
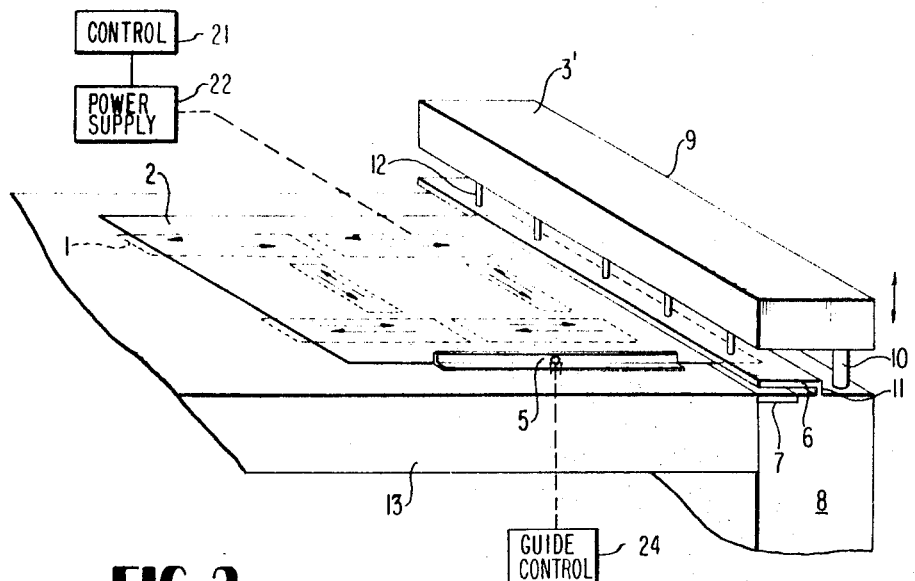
FIG. 2 is a perspective view of the essential portion of the construction of the apparatus made according to the method of the present invention constructed for a punching line of a processing machine.

In FIG. 2, showing an embodiment of the apparatus in accordance with the method of the present invention for a punching line of a processing machine, a punching machine 3' is provided in the feeding line of the metal plate 2. The metal plate feeding unit 1 consists of a number of electromagnets located in the feeding table 13 in parallel relationship with one another and in parallel relation to the feeding direction of the metal plate 2. The metal plate positioning unit 1' consists of a pair of electromagnets disposed in the table 13 in parallel relation to each other and in transverse relation to the feeding direction. In the drawing, the electromagnets are shown in broken lines, and the electromagnetic induction force is effected in the direction shown by the arrows.

The reference numeral 8 indicates a stationary frame of the punching machine 3'. The stationary frame 8 is provided with a pair of columns 10 along which the upper movable frame 9 is vertically slidable. The upper movable frame 9 has a number of punching blades 12 extending downwardly. The lower stationary frame 8 is provided with a guiding member 6 for guiding the upper blades 12 through the guiding perforations thereof. The lower stationary frame 8 is further provided with a lower stationary punching blade 7 fixed thereon. In operation, the upper punching blades are moved downwardly with the upper movable frame 9 through the guiding perforations of the guiding member 6 fixed on the stationary frame 8 and engaged with the lower stationary blade 7. The guiding member 6 is fixed to the stationary frame 8 at the opposite ends thereof so that the metal plate 2 may be fed under the member 6.

On the stationary frame 8 there is further provided a stopper member 11 retractable from the surface of the stationary frame 8 in any suitable manner. The stopper member 11 is so disposed on the stationary frame 8 that a longitudinal variation of the position thereof may be effected. That is, the retractable stopper member 11 is adjustable in the direction of feeding of the metal plate 2. Near the punching machine 3', an angle making or guide member 5 is disposed at the side edge of the feeding table 13. The guide member 5 is rotatable or pivotable about an axis transverse to the surface of the feeding table 13.

In the operation of the punching machine 3' the metal plate 2 is supplied positioned and advanced out of the processing machine as follows. The metal plate 2 is fed on the feeding table 13 by the electromagnetic induction type feeding unit 1 up to the punching machine 3'. When the metal plate 2 approaches the punching machine the stopper member 11 is projected out of the upper surface of the stationary frame 8 in blocking relation to the metal plate 2. When the metal plate 2 reaches the punching machine 3' and its leading end abuts the stopper member 11 the metal plate 2 is stopped at a desired position. Since the position of the stopper member 11 can be varied in the direction of feeding of the metal plate the length of the metal plate to be punched can be varied as desired. After the metal plate 2 is punched, the metal plate 2 is advanced out of the punching machine 3'. When the metal plate 2 is moved downstream of the punching machine, as in the above-described embodiment of the shearing cutter, the stopper member 11 is retracted from the surface of the stationary frame 8 to enable the metal plate to be advanced over the retracted stopper member 11.

There are two possible ways of removing the punched metal plate 2 from the punching machine 3'. One way to remove the punched metal plate from the punching machine, where the metal plate 2 has been supplied to the punching machine by the electromagnetic induction force, is to energize the electromagnets in the electromagnetic feeding unit 1 in the reverse direction to move the punched metal plate 2 backwards. In this first way of removing the punched metal plate 2 from the punching machine, the stopper member 11 need not be made retractable, but may be fixed in position on the stationary frame 8. The second way of removing the punched metal plate 2 from the punching machine 3' is to advance the metal plate 2 in the feeding direction after the plate is punched by retracting the retractable stopper member 11. By moving the retractable stopper member 11 below the surface of the stationary frame 8, the metal plate 2, which is being urged forward by the electromagnetic induction feeding unit 1, is released and is advanced in the feeding direction.

In both ways of removing the metal plate from the punching machine, the metal plate 2 is positioned at the desired angle relative to the feeding direction by the lateral electromagnetic force of the positioning unit 1' and by being appropriately guided and stopped by the guide member 5 disposed at the side of the feeding table 13. This is accomplished in the same manner as in the first embodiment shown in FIG. 1 with respect to the shearing cutter line. Therefore, if the angle making member 5 is inclined at a desired angle to the arranged line of the punching blades 12, the metal plate is provided with perforations arranged in a line inclined at the desired angle to the edge of the plate. In both embodiments shown in FIGS. 1 and 2, the electromagnetic induction units 1, 1' are able to be energized in the reverse direction so as to feed or move the metal plate on the feeding table 13 in the opposite directions.

Since the method of supplying, positioning and removing metal plates from a processing machine in accordance with the present invention is embodied in the apparatus as described hereinabove, there are advantages as described hereinafter.

First, in accordance with the method of the present invention, there is little restriction on the manner of supplying the metal plate to the processing machine due to the structural requirement of the processing machine such as a shearing cutter, punching machine and the like. Accordingly, the designing of the plate supplying or removing apparatus is comparatively easily conducted. This is because the plate supplying table in the apparatus is constructed with a feeding unit of the electromagnetic induction type, which is simple in construction and provides little restriction for designing.

Second, in accordance with the method of the present invention, the chances of trouble or accidents in the metal plate supplying apparatus are greatly reduced. This is because the method of supplying the metal plate, positioning and removing the plate from the processing machine in accordance with the present invention does not require an apparatus of complex construction. The apparatus for accomplishing the method of the present invention has few movable portions and is of simple construction.

Third, the operation for supplying the metal plate to, positioning the same in and removing the same from the processing machine is very much simplified and therefore hazards in these operations are removed, in accordance with the method of supplying and the like of the present invention.

This is because the metal plate is fed by electromagnetic force and the operation by the operator with his hands is eliminated. Accordingly, accidents to human operators, as have occurred in the conventionally known types of the processing machine, are prevented.

Fourth, in accordance with the method of the present invention, it has become quite easy to remove the metal plates in the direction opposite to that of supplying the same. This is accomplished by energizing the electromagnets used for feeding the metal plate in the opposite direction.

Fifth, in accordance with the present invention, the positioning of the metal plate in the processing machine can be easily and certainly accomplished by energizing the positioning unit of the electromagnetic induction system. By urging the metal plate laterally and forwardly, and stopping the metal plate by a stopper member and guide member, the metal plate can be positioned precisely and easily. Furthermore, the urging force of the electromagnets can be eliminated easily by merely de-energizing the electromagnets. Accordingly, the positioning of the metal plate can be accomplished by a very simple construction.

Sixth, in accordance with the method of the present invention, it is easy to automate the metal plate supplying, positioning and removing operation. Further, it is possible to make a simple arrangement for numerical control of supplying, positioning and removing the metal plates and to put it into practice. The process utilizing the method in accordance with the present invention is easily, remotely, controlled and has few movable portions and, accordingly, has few troubles. Also, the positioning of the metal plate can be precisely controlled by remote-control. Therefore, automation and numerical control can be accomplished with low cost and ease in accordance with the present invention.

I claim:

1. Method of supplying a metal plate to, positioning the same in and removing the same from a processing machine which comprises the steps of: advancing said metal plate on a feeding table electromagnetic induction force toward said processing machine, stopping said metal plate with a retractable stopper member by projecting said stopper member above the surface of the feeding table, laterally moving said metal plate by electromagnetic induction force up to a predetermined position wherein said metal plate is stopped by a side guide member, and removing said metal plate from said predetermined position by retracting said stopper member below the surface of the feeding table.

2. Method of supplying a metal plate to, positioning the same in and removing the same from a processing machine as defined in claim 1 wherein said predetermined position is the position in which the metal plate is to be processed in the processing machine.

3. Method of supplying a metal plate to, positioning the same in and removing the same from a processing machine which comprises the steps of: feeding said metal plate on a feeding table electromagnetic induction force toward said processing machine, stopping said metal plate with a stopper member, laterally moving said metal plate by electromagnetic induction force up to a predetermined position where said metal plate is stopped by a side guide member and where said plate is to be processed by said processing machine, and removing said metal plate from said predetermined position by an electromagnetic induction force energized in the opposite direction to that for feeding said metal plate toward said processing machine.

4. Method of supplying a metal plate to, positioning the same in and removing the same from a processing machine as defined in claim 3 wherein side guide member is rotatable about an axis transverse to the surface of the feeding table on which said metal plate is fed, and said side guide member is positioned at a predetermined angle before said metal plate is moved laterally, whereby said metal plate is processed at the predetermined angle by the processing machine.

5. An apparatus for supplying a metal plate to, positioning the same in and removing the same from a processing machine which comprises a feeding table having an electromagnetic induction type feeding unit under the surface thereof, said feeding table being disposed at the upstream and downstream ends of a processing machine, said feeding table including an electromagnetic induction type positioning unit under the surface thereof near said processing machine for moving said metal plate laterally on said table, a retractable stopper member provided at the downstream end of said processing machine for stopping the advancement of said metal plate by said feeding unit at a position on said table position near said processing machine, and side guide means disposed at the upstream and downstream ends of said processing machine for stopping the lateral movement of said metal plate by said positioning unit at a predetermined position on said feeding table.

6. An apparatus as defined in claim 5 wherein said side guide means comprises a guide member that is rotatable about an axis transverse to the surface of said feeding table and serves to control the angle of said metal plate when it is at said predetermined position.

7. An apparatus as defined in claim 6 wherein said retractable stopper member is rotatable about an axis transverse to the surface of said feeding table.

8. An apparatus for supplying a metal plate to, positioning the same in and removing the same from a processing machine which comprises a feeding table connected at an end thereof with said processing machine, said feeding table having an electromagnetic induction type feeding unit for feeding said metal plate in a longitudinal direction toward said processing machine, and an electromagnetic induction type positioning unit for moving said metal plate in a lateral direction when it is near said processing machine, a side guide member disposed at the side edge portion of said feeding table near said processing machine for stopping the lateral movement of said metal plate, and a stopper member disposed in said processing machine for stopping the longitudinal movement of said metal plate, said electromagnetic feeding unit being able to be energized so as to move said metal plate on said table in opposite longitudinal directions.

9. An apparatus as defined in claim 8 wherein said stopper member is fixed to said processing machine.

10. An apparatus as defined in claim 8 wherein said side guide member is rotatable about an axis transverse to the surface of said feeding table.

11. An apparatus as defined in claim 10 wherein said stopper member is rotatable about an axis transverse to the surface of said feeding table.

12. An apparatus as defined in claim 5 wherein said processing machine is a shearing cutter.

13. An apparatus as defined in claim 8 wherein said processing machine is punching machine.

14. An apparatus as defined in claim 13 wherein said punching machine comprises a punching blade guiding plate and said stopper member is integral with said guiding plate.

* * * * *